US010095722B1

(12) United States Patent
Gopalakrishnan et al.

(10) Patent No.: US 10,095,722 B1
(45) Date of Patent: Oct. 9, 2018

(54) HYBRID SPATIAL AND COLUMN-ORIENTED MULTIDIMENSIONAL STORAGE STRUCTURE

(71) Applicant: Amazon Technologies, Inc., Seattle, WA (US)

(72) Inventors: Ajay Gopalakrishnan, Bellevue, WA (US); Mukul Vijay Karnik, Redmond, WA (US); Jared Scott Lundell, Mercer Island, WA (US); Yoav Srebrnik, Seattle, WA (US); Santosh Kalki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 616 days.

(21) Appl. No.: 14/672,880

(22) Filed: Mar. 30, 2015

(51) Int. Cl.
G06F 17/30 (2006.01)

(52) U.S. Cl.
CPC .. G06F 17/30333 (2013.01); G06F 17/30315 (2013.01); G06F 17/30339 (2013.01); G06F 17/30589 (2013.01)

(58) Field of Classification Search
CPC ........ G06F 17/30333; G06F 17/30315; G06F 17/30339; G06F 17/30589
USPC ........................................................ 707/741
See application file for complete search history.

(56) References Cited

U.S. PATENT DOCUMENTS

| 6,625,611 | B1 * | 9/2003 | Teig | G06F 17/5081 |
| | | | | 707/999.102 |
| 2002/0194163 | A1 * | 12/2002 | Hopeman | G06F 17/30489 |
| 2004/0230554 | A1 * | 11/2004 | An | G06F 17/30241 |
| 2005/0131929 | A1 * | 6/2005 | Bailey | G06F 17/30592 |
| 2009/0182837 | A1 * | 7/2009 | Rogers | G06F 17/30961 |
| | | | | 709/215 |
| 2011/0040697 | A1 * | 2/2011 | Constantinou | G06Q 10/06 |
| | | | | 705/348 |
| 2011/0219020 | A1 * | 9/2011 | Oks | G06F 17/30 |
| | | | | 707/769 |
| 2013/0249915 | A1 * | 9/2013 | Stich | G06T 15/06 |
| | | | | 345/426 |
| 2013/0275365 | A1 * | 10/2013 | Wang | G06F 17/30592 |
| | | | | 707/602 |
| 2014/0006411 | A1 * | 1/2014 | Boldyrev | G06F 17/30336 |
| | | | | 707/741 |
| 2014/0052711 | A1 * | 2/2014 | Bamba | G06F 17/30241 |
| | | | | 707/718 |
| 2015/0324399 | A1 * | 11/2015 | Tyercha | G06F 17/30241 |
| | | | | 707/792 |

* cited by examiner

*Primary Examiner* — Jensen Hu
(74) *Attorney, Agent, or Firm* — Davis Wright Tremaine LLP

(57) ABSTRACT

Data may be stored using hybrid multidimensional and column-centric storage techniques. A hierarchy of regions of a multidimensional space may be maintained on one or more storage devices. Range information for the hierarchy may be maintained in a column-centric storage. Leaf nodes of the hierarchy may comprise tuple data stored in a column-centric storage. Tuples may be located by identifying candidate regions encompassing the tuple and scanning column-centric stores at the leaf level. Region splitting may be deferred to favor column-centric search characteristics.

20 Claims, 10 Drawing Sheets

HYBRID SPATIAL AND COLUMN-ORIENTED MULTIDIMENSIONAL STORAGE STRUCTURE

BACKGROUND

Online analytical processing ("OLAP") may involve storing, retrieving, and processing multidimensional data. Typical OLAP operations such as rolling-up, drilling-down, and pivoting on a various dimensions of the data being analyzed. OLAP applications are often called upon to provide support for an interactive approach to analysis, wherein a user submits an initial query followed by various refinements, pivots, and drill-downs into different aspects of the data. Quick processing of OLAP queries enables an interactive approach to data analysis.

A typical approach to storing, retrieving, and processing data in OLAP applications involves the use of multidimensional tree structures. These have various properties that are well-suited to certain types of OLAP operations, such as those that involve spatial relationships or "nearest-neighbor" problems. There are, however, various drawbacks to storing OLAP data in a multidimensional tree. Examples of these drawbacks include duplication of data and the inefficient operation of column-centric operations such as aggregation and summation. Because of these drawbacks, multidimensional data is sometimes stored in a column-centric fashion. Storing data in a column-centric fashion may improve the performance of operations such as aggregation and summation, while at the same time degrading the performance of those operations to which multidimensional tree structures are typically well-suited.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
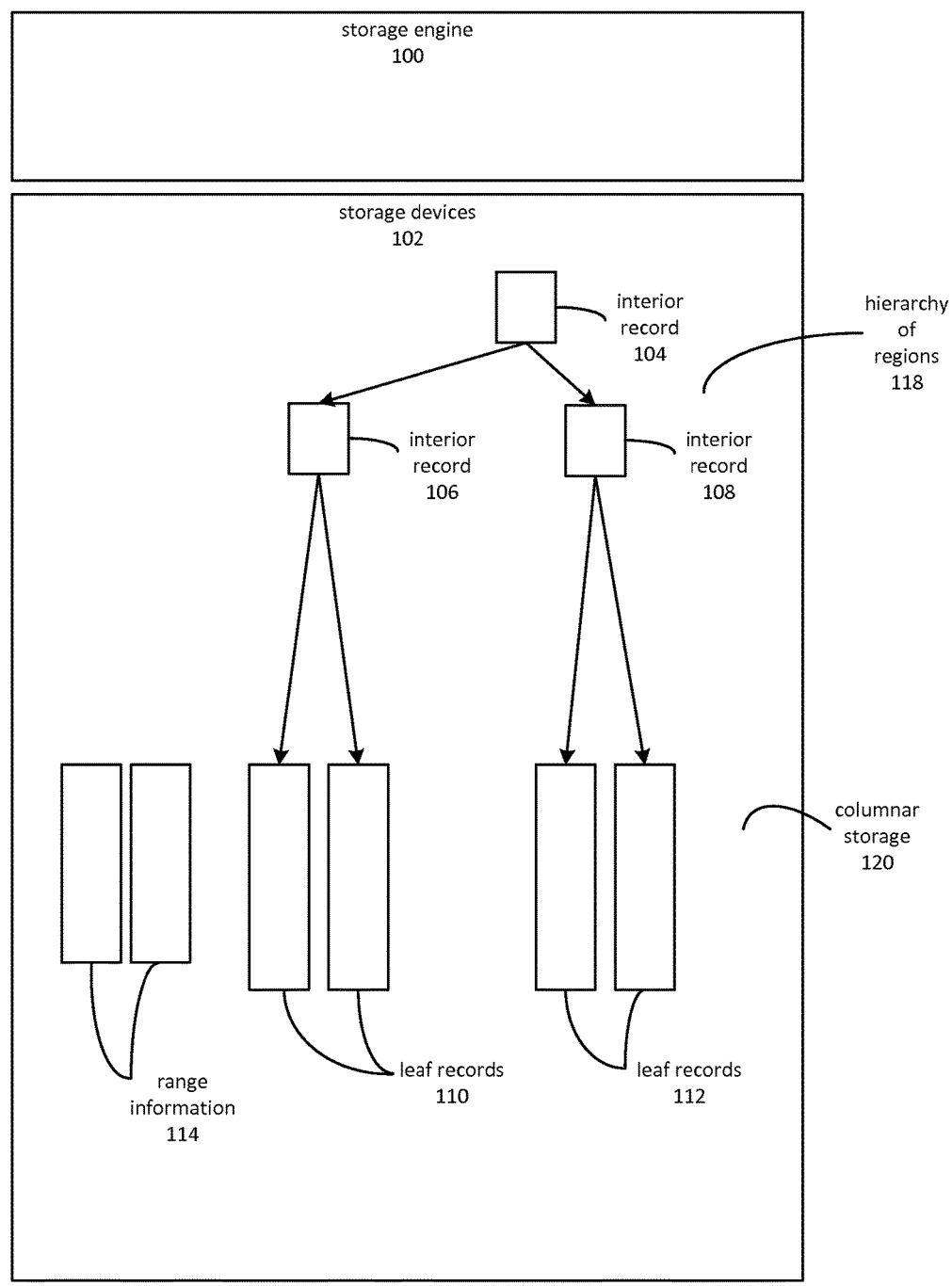
FIG. 1 is a block diagram depicting an example embodiment of a system for storing and retrieving data using a multidimensional data structure and columnar storage.

Processing multidimensional data may comprise using a hybrid technique to store data using a multidimensional hierarchical index with an integrated column-centric storage. Column-centric storage involves storage techniques that emphasize processing on a column-by-column basis rather than on a row-by-row basis. Column-centric storage may therefore offer increased efficiency for queries that operate sequentially on a sequence of values for a single column, rather than those queries that operate across the columns of a given row. The hybrid technique may include representing data as a hierarchy of regions in a multidimensional space, where the regions are represented by interior records of a tree structure. At the leaf nodes of the structure, data is maintained in columnar data stores. The columnar data stores are adapted to column-centric operations. The leaf node portion of the structure may, for example, be maintained on a storage device so that data for a particular column, or dimension, is aligned on the storage block boundaries of the device.

In one example embodiment, a storage engine may interface with one or more storage devices to store a plurality of records on the one or more storage devices. A storage engine may, in some embodiments, act as an interface between components such as a database or data analysis query engine and a storage device. The operations performed by a storage engine may involve formatting records for storage on a storage device, causing appropriate links between records to be persisted, and processing records maintained on the disk during execution of queries. The storage engine may further optimize storage and retrieval mechanisms based on the characteristics of the storage devices on which it operates.

The records stored on the storage device by the storage engine are used to represent a hierarchy of regions within a multidimensional space. A multidimensional space can include a collection of tuples mapped onto the axis of each dimension in the multidimensional space. A region can correspond to an area of within the space, and may encompass zero or more tuples. The dimensions of the space may correspond to columns of a table, or more generally to types of values in tuples that are to be stored using the hybrid technique.

Each record may contain information describing the region to which it corresponds. The records may comprise various interior records that correspond to regions of the hierarchy. An interior record may comprise information (or, equivalently, a link to information) that is indicative of the region of the multidimensional space to which the record corresponds. The interior record may also comprise information for accessing corresponding leaf records. The leaf records are those that contain the subset of data that is encompassed by the region. The data is maintained as columnar data in one or more column stores.

Various operations performed on the records may involve determining whether or not a particular set of values—which may be referred to as a tuple—has already been stored by the system. The example embodiment may form a first set representation of those regions of the multidimensional space that encompass a first value in the tuple. One example of a set representation is a bitmap whose bit positions correspond to regions in the hierarchy, and in which a set bit may indicate that the corresponding region encompasses the first value in the tuple. Additional set representations may be formed for the other dimensions of the tuple.

Using an intersection of the set representation, the embodiment may determine whether or not a region of the multidimensional space encompasses the tuple. If no such region exists, the example embodiment may determine to modify a region of the multidimensional space to encompass the tuple. The system can then add the values of the tuple to the column stores of the leaf nodes associated with the region.

The operation of an example embodiment of the present disclosure may be understood in view of the following scenario. A collection of data might consist of a first column of product category data, and a second column of product identifiers, and a third column of sales figures. Thus, a particular row of the collection might comprise a product category column, a product identifier column, and a sales figure column. One or more of these dimensions (as well as other derived from various sources) might be incorporated into a multidimensional space stored using techniques consistent with the present disclosure. For example, a $1^{st}$ dimension of the multidimensional space might correspond to the product category column, and a $2^{nd}$ dimension might correspond to the sales figure column.

A hierarchy of regions might define regions of the multidimensional space, where each region may encompass one or more tuples of data derived from the original collection. For example, a first region might encompass all of the tuples derived from the original collection. It might then be linked to two child regions, each of which represents a subset of the tuples. One of the regions might encompass tuples having product category values between 'A' and 'M' and sales figures between zero and ten million. The other region might encompass tuples having product category values between 'G' and 'Z' and sales figures between twelve million and twenty million. The regions may overlap, as described here.

The regions may be represented by interior record in a tree structure. Each interior record may contain, be linked to, or otherwise comprise information describing the region the interior record corresponds to. This information can comprise range information for the dimensional bounds of the region. In some cases, it may be represented by minimum and maximum values for each dimension.

The tuples themselves may be stored in a column-centric format at the leaf level of the tree structure. A leaf record may be a child of an interior record and may contain values, stored in column-centric format, of the tuples encompassed by the region.

Continuing with the example scenario, the storage engine might receive a request to store a new tuple. The values for the tuple might be a product category of 'K' and a sales figure of eleven million. The interior record at the root of the hierarchy already encompasses this tuple, but its children do not since one contains sales figures up to ten million and the other contains sales figures above twelve million. One of these regions, represented by an interior node, may be enlarged to contain the new tuple, and its values may be stored in the column-centric storage associated with a leaf node associated with the enlarged region's interior node.

An aspect of adding the new tuple may involve determining whether or not it is already encompassed by an existing region and if so, whether the tuple has itself been stored. Determining whether a tuple is encompassed by a region may be determined by first forming, for each dimension, a bitmap that indicates which regions in the hierarchy encompass the value in that dimension. Continuing with the example scenario, a first bitmap might be "110" since the tuple's product value category of 'K' is encompassed by the root of the hierarchy and the first child region. The second bitmap might be "100" since the value is only encompassed by the root of the hierarchy. Forming an intersection of these two bitmaps results in "100." This indicates that the new tuple is only encompassed by the root of the hierarchy.

If a node is encompassed by a region, it might be present in column-centric storage at the leaf level of the hierarchy. For example, consider a second tuple consisting of product category 'A' and sales figure one million. For each dimension the corresponding bitmap could be "110," in which case the intersection of these two would also be "110." Column stores at leaf-level nodes associated with regions corresponding to the set bits could then be scanned to determine if the tuple is present.

FIG. 1 is a block diagram depicting an example embodiment of a system for storing and retrieving data using a hybrid technique. A storage engine 100 may receive requests to store data on and retrieve data from one or more storage devices 102. Embodiments may process requests to store tuples of data—such as the rows of a table—by traversing a data structure that is representative of a hierarchy of regions 118 of a multidimensional space. At the leaf level of the hierarchy, the embodiment may employ columnar storage 120 to store tuple values in a column-oriented manner, e.g., using techniques and mechanisms optimized for column-oriented processing of data. Column-oriented storage at the leaf level may result in the improved operation of queries involving aggregation, summarization, and so forth, as these types of queries tend to be column-centric. At the same time, the interior records forming the hierarchy of regions 118 may improve search efficiency.

The hierarchy of regions 118 may be formed by a tree or graph that is representative of regions of a multidimensional space. The dimensions of the multidimensional space may correspond to columns of data from a table or keys from a collection of key-value pairs. In some cases, the columns may correspond to those of a table to be maintained entirely within columnar storage 120. In other cases, the dimensions may correspond to a subset of the data to be maintained in columnar storage 120. It may, in various instances, be difficult to predict a priori which dimensions may be needed. The hierarchy of regions 118 may therefore, in some instances, accommodate a high number of dimensions. Even in such instances, columnar storage 120 may provide for efficient processing of column-centric queries.

An interior record 104 may define a region of the multidimensional space that encompasses sub-regions defined by its child interior records, such as interior records 106 and 108, and the data points maintained in a child leaf record, such as leaf records 110 and leaf records 112. An interior record, such as interior records 104, 106, and 108, may include data that defines the ranges of values that fall within the region. For example, interior record 106 might be associated with minimum and maximum values of [5, 10] in a $1^{st}$ dimension, [200, 400] in a $2^{nd}$ dimension, and ['A', 'M'] in a $3^{rd}$ dimension. The multidimensional space might, in some cases, consist of additional dimensions whose ranges are not defined in a particular region.

In various instances, range information, such as the minimum and maximum values contained in a region, may be maintained in columnar storage 120. A variety of approaches to column-centric storage of range information may be employed. In some instances, each value in a column of range information may indicate a boundary (e.g., a minimum or a maximum value) for a dimension. Referring to FIG. 1, the first value might correspond to the minimum value of the region defined by interior record 104, the second value to the minimum value of the region defined by interior record 106, and the third value to the minimum value of data stored in one of leaf records 110. The column might continue in this fashion to define minimum values for each interior and leaf record. This example is provided for illustrative purposes and should not be construed as limiting. In another non-limiting example, tuples of range information for a given dimension might be stored in column-centric fashion. A tuple comprising the minimum and maximum values for a given region might, in this example, be stored as a single value. The set of such tuples might then be stored as a column. For illustrative purposes, FIG. 1 depicts two columns of range information 114, the first corresponding to a first dimension and the second corresponding to a second dimension of the multidimensional space.

Regions of the multidimensional space may overlap with other regions. For example, a portion of the region defined by interior record 106 may overlap with the region defined by interior record 108. In some cases—typically when the number of dimensions in the multidimensional space is relatively low—overlap of the regions may be reduced or eliminated. In others—typically when dimensionality is high—there may be greater overlap. Reducing the amount of overlap in a region may correspond to greater efficiency. When the regions defined by interior regions overlap, the leaf nodes linked to the interior regions may contain duplicate data. For example, leaf records 110 might contain values for a tuple that is also contained in leaf records 112. Operations such as updates would then have to locate both instances of the tuple. Similarly, the efficiency of search operations may be degraded if there are fewer opportunities for pruning irrelevant branches of the hierarchy from a search due to a greater number overlapping regions. Nevertheless, particularly when dimensionality is high, there may be a high degree of overlap.

Embodiments may determine to split a region in response to various determinations regarding efficiency characteristics related to search and retrieval operations within the hierarchy of regions 118 and on columnar storage 120. The efficiency characteristics related to operations involving the hierarchy of regions 118 may, in various cases, be opposed to those involving columnar storage 120. For example, splitting a region may reduce the degree of region overlap and thereby increase search efficiency within the hierarchy of regions 118. It may also increase update efficiency of tuples maintained in columnar storage 120. However, splitting the region may reduce the efficiency of column-oriented operations such as aggregation and summation. As a result, embodiments may defer splits in various instances in order to balance these factors. One such case may involve multi-dimensional spaces with a high degree of dimensionality. In cases where the number of dimensions in the multidimensional space is high, splitting regions may reduce overlap to a lesser degree than cases where the number of dimensions is low. In other words, the split may be less effective when the number of dimensions is greater. Embodiments may, in cases such as these, defer splits that would normally occur in favor of storing a greater amount of data in the columnar storage associated with the leaf records linked to the region. In some cases, splits may be deferred until the system is functioning as if it were based entirely on columnar storage, rather than as a hybrid of multidimensional and columnar storage. For example, leaf records 110 and 112 might be permitted to grow indefinitely rather than splitting the regions represented by interior records 106 and 108 into additional regions. When performing a storage or retrieval operation, the storage engine 100 might then spend the most of the time processing the column-oriented data in leaf records 110, and a minimal amount of time processing interior records 104, 106, or 108.

The hierarchy of regions 118 and columnar storage 120 may be maintained by storage engine 100 on one or more storage devices 102. In some embodiments, hierarchy of regions 118 may be maintained on a separate storage device, of storage devices 102, than columnar storage 120. Storage engine 100 may, for example, maintain hierarchy of regions 118 within a random access memory ("RAM"), and columnar storage 120 on a solid-state drive. In some instances, a portion of the hierarchy of regions 118, such as range information for the regions of the hierarchy 118, may be maintained in a columnar format on the solid state drive.

Figure 2:
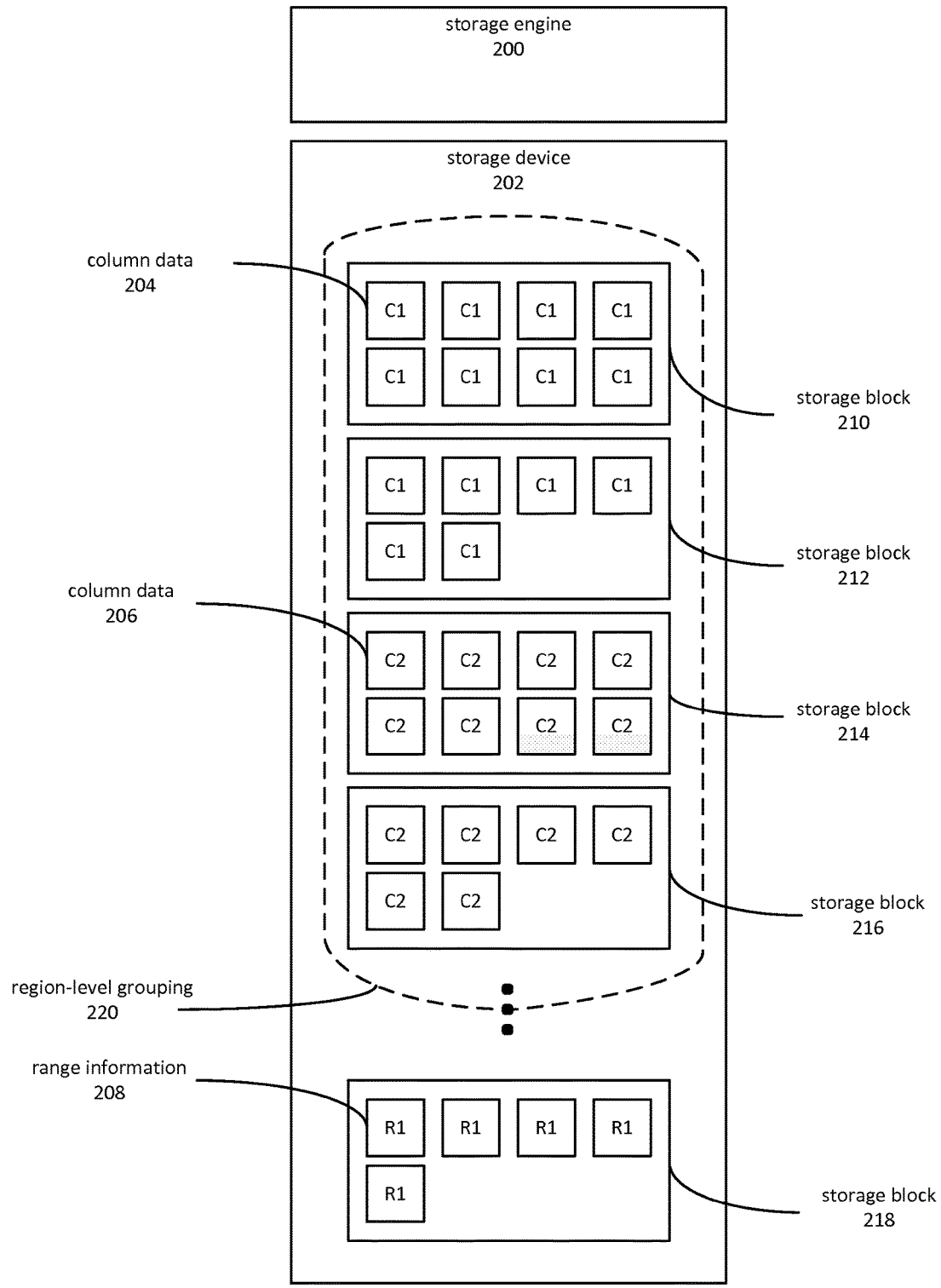
FIG. 2 is a block diagram depicting an example of a storage engine maintaining tuple data and range information on a storage device.

FIG. 2 is a block diagram depicting an example of a storage engine maintaining tuple data and range information on a storage device. A storage engine 200 may maintain tuple data on storage device 202. In order to illustrate various operational principles of storage engine 200 vis-a-vis storage device 202, it may be assumed that a tuple comprises data for at least two columns, labeled "C1" and "C2." The storage device 202 may comprise various storage blocks 210, 212, 214, 216, and 218. A storage block may refer to units of storage on storage device 202 that may be stored and/or retrieved as a unit. For example, solid-state drives are typically associated with a read block size and a write block size. The storage blocks 210-218 might correspond to one of the read block sizes or the write block sizes. Typically, alignment on read block size may improve efficiency of read operations, while alignment on write block size may improve efficiency of write operations.

Storage engine 200 may cause data for a given column to be grouped in, and in some cases aligned on, storage blocks of storage device 202, such as storage blocks 210-218. For example, column data 204 for column C1 may be grouped in and aligned on storage blocks 210 and 212, while column data 206 for C2 might be grouped in and aligned on storage blocks 214 and 216. Grouping of data for a given column within a given set of storage blocks allows for more efficient processing of data pertaining to the column. Alignment on storage block boundaries may reduce input/output traffic by reducing processing of data not related to the column of interest.

In some cases, column data associated with a particular leaf-node, or more generally all column data associated with a particular region, might be grouped together. This is depicted in FIG. 2 by region-level grouping 220.

Range information for a hierarchy of regions may be stored in a similar fashion. Data for a given dimension might be grouped in and, in some cases, aligned on storage block boundaries. For example, range information 208 might comprise data for a $1^{st}$ dimension of a multidimensional space. The data might correspond to the minimum or maximum values, for the $1^{st}$ dimension, of regions in a hierarchy of regions.

The number of regions defined in the hierarchy of regions influences the degree to which data is stored in column-centric fashion. At one extreme, a region in the hierarchy might be defined so narrowly as to encompass only a single tuple. In this case, a leaf node corresponding to the region might contain only a single value for a given column. At the other extreme, a region in the hierarchy might be defined so broadly that it encompasses all of the tuples to be stored, in which case a leaf node for the region might contain all of the values for a given column. Aspects of the present disclosure involve determinations regarding how regions in the hierarchy are determined. One aspect of these determinations involves determining when to split an existing region or when to defer splitting a region.

Figure 3:
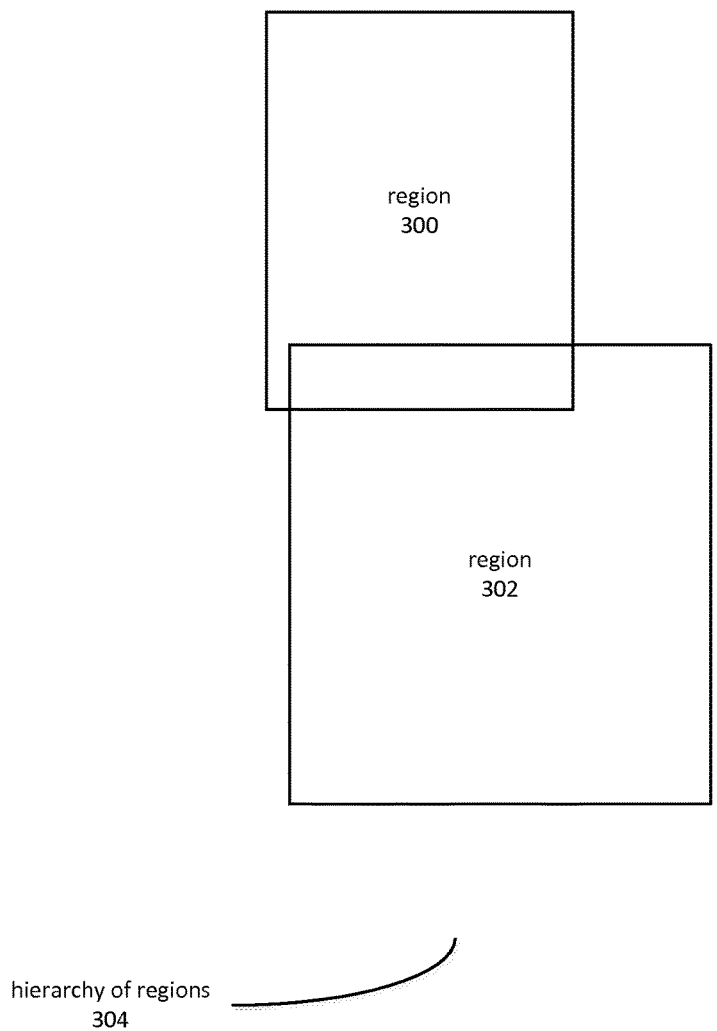
FIG. 3 depicts aspects of splitting and deferring a split of a region of a multidimensional space.
Figure 4:
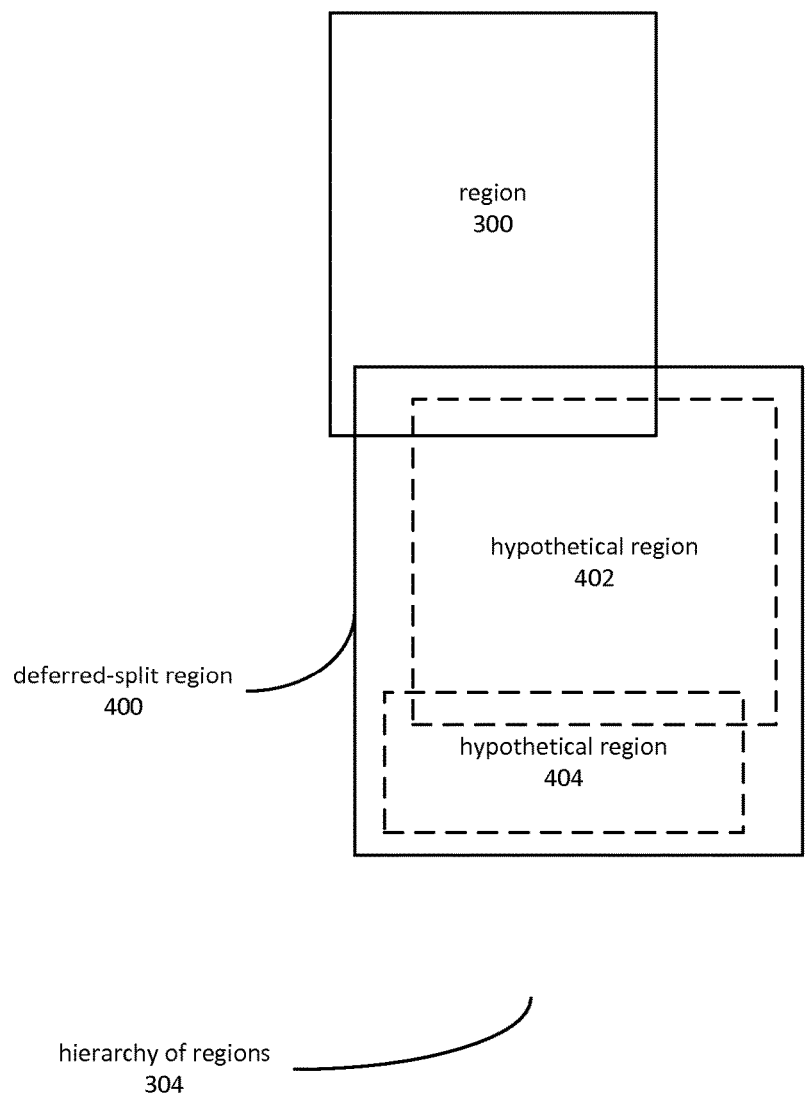
FIG. 4 depicts aspects of splitting and deferring a split of a region of a multidimensional space.

FIGS. 3 and 4 depict aspects of splitting and deferring a split of a region of a multidimensional space. In FIG. 3, a hierarchy of regions 304 comprises two regions, region 300 and 302. The two regions 300 and 302 overlap, which as described herein may degrade the efficiency of processing records in the hierarchy of regions 304.

In FIG. 4, hierarchy of regions 304 consists of the same region 300 and a deferred-split region 400. In some cases, deferred-split region 400 may be equivalent to the region 302 depicted in FIG. 3. The primary characteristic of deferred-split region 400 is that it could be split into at least two hypothetical regions, such as hypothetical regions 402 and 404, to either reduce the amount of overlap between deferred-split region 400 or to simply reduce the number of tuples encompassed by each region. Embodiments may, however, determine not to split the region based on various techniques described herein.

Embodiments determine to split the deferred-split region 400 based on various factors, including an amount of overlap between the deferred-split region 400 and other regions in the hierarchy of regions 304, the depth of the hierarchy of regions 304, and/or time spent accessing data in columnar data stores at leaf nodes in the hierarchy of regions 304.

The degree to which the region overlaps other regions may be an indication of inefficiency in searching the hierarchy of regions 304. This may occur, for example, due to the inability to prune a branch of the hierarchy of regions 304 due to overlap. Accordingly, embodiments may determine to split the deferred-split region 400 when the degree of overlap exceeds some threshold amount. The degree of overlap may be determined or estimated through various means, such as measuring the volume of overlap in the multidimensional space. The threshold amount of overlap may be based on balancing search efficiency in the hierarchy of regions 402 with search efficiency in columnar storage.

Embodiments may also determine to split deferred-split region 400 based on the depth of hierarchy of regions 304. Here, depth of the hierarchy of regions 304 refers to the distance (i.e., the number of linked records) between the root of the hierarchy of regions 304 and a leaf node. The depth may be compared to a threshold depth. As with the degree of overlap, the threshold depth may be based on balancing search efficiency in the hierarchy of regions 402 with search efficiency in columnar storage.

Search efficiency in columnar storage may involve time spent searching for values or otherwise traversing entries in columnar storage. Embodiments may use numbers of entries in leaf-level columnar storage as a proxy for time spent searching, because the time spent searching or otherwise traversing these entries in a columnar data store is often proportional to the number of entries. Search efficiency may be used as a balancing factor as described above. Search efficiency may also be used in other ways, and may be a direct factor in determining whether a deferred split region 400 should be split. Embodiments may utilize the amount of time spent searching an individual column store to determine that the corresponding region may have grown beyond a target size and can be split.

Embodiments may, in some instances, make a determination to defer a split of a region based on the dimensionality of the multidimensional space. Some embodiments may map threshold numbers of dimensions to maximum numbers of values to store, per column, in a given leaf node. Below this number of values, a split may be deferred even when the region, e.g., deferred-split region 400, could be split to reduce overlap. Some embodiments may base split deferral on a ratio of the number of dimensions in the corresponding multidimensional space to the number of values stored in a leaf record.

In another embodiment, a growth threshold value may be used to control split determinations. The growth threshold may correspond to an amount of data, such as a number of values per column stored in a leaf node. Embodiments may defer splitting a region until the number of values stored rises above the threshold. Embodiments may adjust the growth threshold to reduce splitting. In some cases, the adjustment may be based on the dimensionality of the multidimensional space. Higher dimensionalities may correspond to a higher threshold and a corresponding reduction in the amount of splitting. It may, in some cases, be indicated to have a relatively high threshold in order to increase the efficiency of operations involving column-oriented operations, such as aggregations and summations.

Figure 5:
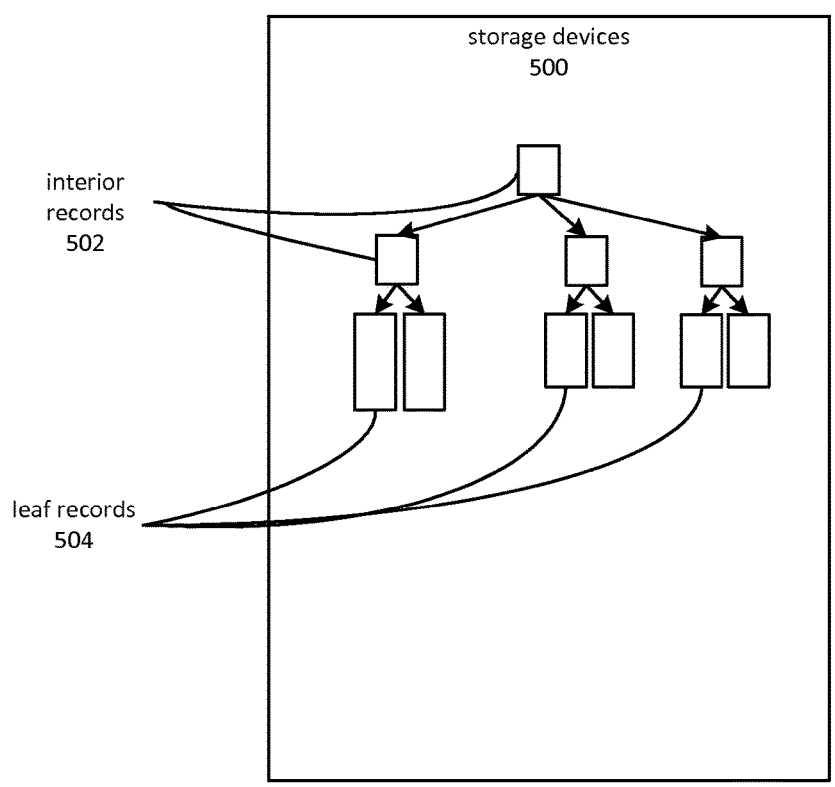
FIG. 5 is a block diagram depicting a balanced hybrid multidimensional and columnar storage maintained on a storage device.
Figure 6:
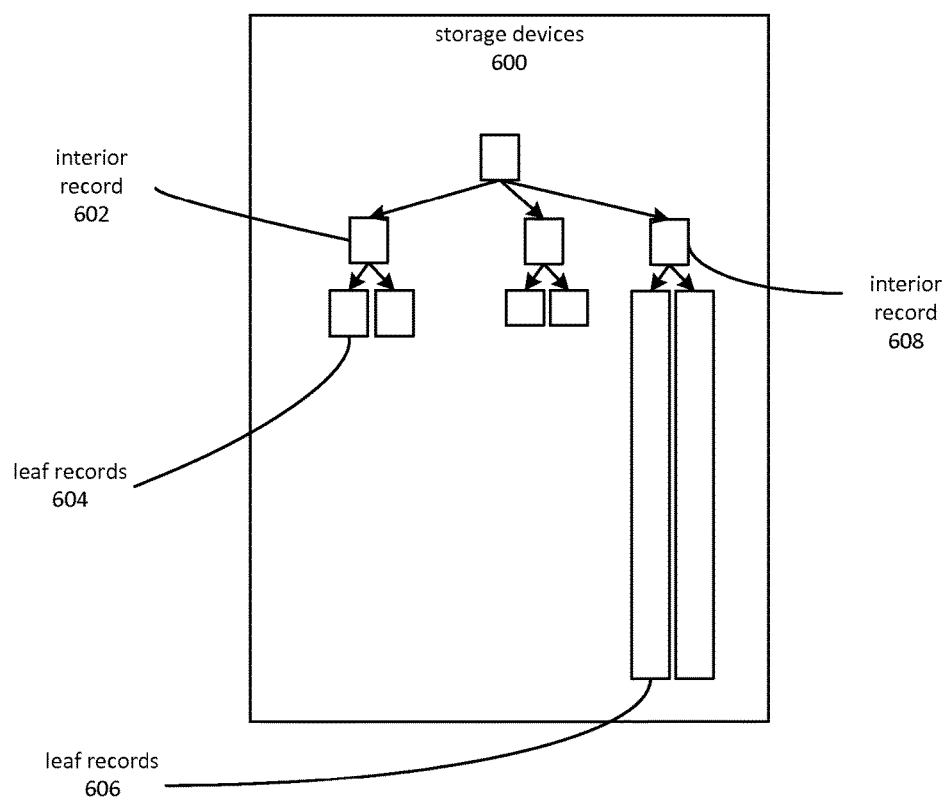
FIG. 6 is a block diagram depicting an unbalanced hybrid multidimensional and columnar storage maintained on a storage device.

Adjustments to the conditions in which regions are split may influence the characteristics of the system regarding multidimensional versus column-centric efficiency. FIGS. 5 and 6 provide examples of hybrid multidimensional and columnar storage systems having biases toward multidimensional and columnar efficiency.

FIG. 5 is a block diagram depicting a balanced hybrid multidimensional and columnar storage maintained on storage devices 500. The various interior records 502 may define regions, of various sizes, encompassing approximately equal numbers of tuples. The various leaf records 504 may each contain approximately equal numbers of values corresponding to the dimensions of the tuples.

FIG. 6 is a block diagram depicting an unbalanced hybrid multidimensional and columnar storage maintained on storage devices 600. The interior records may define regions, of various sizes, that encompass regions of different size. For example, interior record 602 may correspond to a relatively small region as compared to the region defined by interior record 608. The leaf records 604 associated with the smaller region of interior record 602 might then contain relatively few tuples as compared to leaf records 606, which are associated with the larger region of interior record 608.

Figure 7:
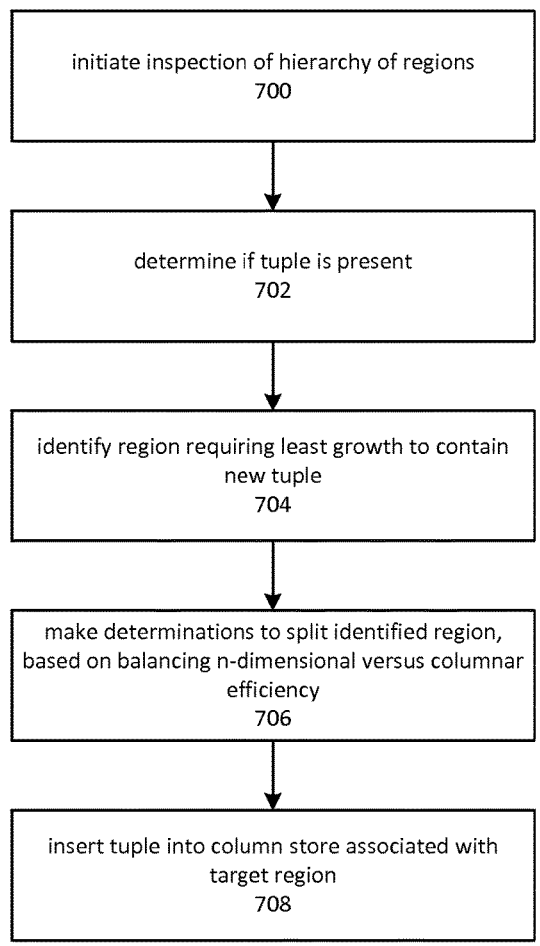
FIG. 7 is a flow diagram depicting an insertion of a tuple into a hybrid multidimensional and columnar data store.

FIG. 7 is a flow diagram depicting insertion of a tuple into a hybrid multidimensional and columnar data store. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Insertion of a tuple generally involves an inspection of the hierarchy of regions for the hybrid data store. The inspection may involve traversal of links between interior records in the hierarchy of regions. In some instances, the inspection may involve columnar storage of range information for the regions defined in the hierarchy. The range information may be retrieved from storage and compared to the values contained in the tuple that is to be inserted. Block 700 depicts initiating the inspection of a hierarchy of regions.

Figure 8:
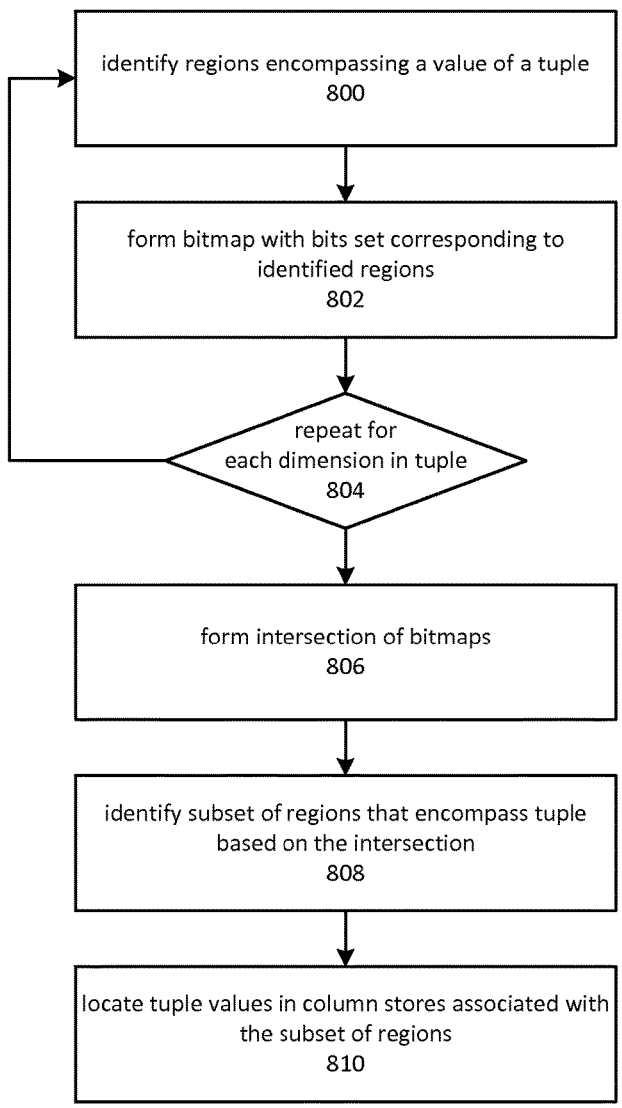
FIG. 8 is a flow diagram depicting locating a tuple within a hybrid multidimensional and columnar data store.

Block 702 depicts determining if the tuple has already been stored in the hybrid structure. This may comprise various operations, as depicted in FIG. 8, for identifying regions that encompass the tuple and searching column stores associated with the identified regions.

As depicted by block 704, embodiments may inspect interior records that form the hierarchy of regions in order to identify a region in which to insert the new tuple. A storage engine, for example, may inspect the elements of the hierarchy and determine which regions encompass or could encompass the new tuple that is to be inserted. The storage engine might select the region that requires the least growth, or that would grow less than some threshold amount. Growth may refer primarily to the size of the multidimensional region in spatial terms, as derived from its range information. Embodiments may employ various calculations or estimation procedures to determine an amount of growth required.

As depicted by block 706, embodiments may make a determination to split a region identified as a candidate for containing the new tuple. The embodiment may base its determination on balancing factors that affect the efficiency of multidimensional operations against those that affect columnar operations. In some cases, a split may be both feasible and called for based on the effect of the split on multidimensional operations. However, at the same time, the split might negatively impact columnar operations due to factors such as dividing the column stores associated with the original region into two or more additional regions. Accordingly, a region may be identified as a candidate for splitting, but the split of the region may be deferred until the storage engine determines that the deferred split should be performed.

Block 708 depicts the embodiment inserting the tuple into a column store associated with the target region, which may be a previously existing region or one created by a split. If necessary, the boundaries of the region are adjusted so that the region encompasses the new tuple. If the region has a parent region, its boundaries may also be adjusted to encompass the region.

FIG. 8 is a flow diagram depicting locating a tuple within a hybrid multidimensional and columnar data store. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

At block 800, an embodiment identifies regions in a multidimensional hierarchy that encompass a value of a tuple. For example, a storage engine might compare the value to range information for the regions of the hierarchy, corresponding to the value's dimension. The storage engine may compare the value to the minimum and maximum values of the dimension for each region of the hierarchy, although, in some embodiments, branches of the search may be trimmed In some embodiments, the storage engine may retrieve the minimum and maximum values for a dimension from a columnar data store. This approach may improve efficiency of the search, because it allows for a number of minimum or maximum values to be quickly compared without needing to traverse between elements of a graph structure.

At block 802, the embodiment may form a bitmap representing the regions of the hierarchy. Positions in the bitmap may map to interior and/or leaf records of the hierarchy of regions. A bit in the bitmap may be set to indicate that the region encompasses the value. Multiple regions may encompass the value due to overlap between regions.

As depicted by block 804, the operations of block 802 and 804 may be repeated for each dimension in the tuple. When each dimension has been handled, a bitmap may have been formed for each dimension. As depicted by block 806, embodiments may then calculate an intersection of the bitmaps. In some cases, the intersection may be formed by a bitwise "or" operation on bitmaps formed in steps 800-804. In other cases, the intersection may be calculated on an ongoing basis in steps 800-804.

The intersection of the bitmaps is representative of regions in the hierarchy that encompass the tuple in all of the tuple's dimensions. At block 808, the intersection may be used to identify those regions. The interior and/or leaf records corresponding to the intersection points may be identified based on correspondence between bitmap positions and the regions of the hierarchy. The intersection points may be those bits that remain set after forming the intersection. For example, if there are three regions, a bitmap for a $1^{st}$ dimension might be "010" if the second region encompasses the first value of the tuple, corresponding to the $1^{st}$ dimension. A second bitmap for a $2^{nd}$ dimension might be "011" if the second and third regions encompass the second value of the tuple, corresponding to the second dimension. The intersection of these two bitmaps could then be "010." The intersection points—in this case just the second bit of "010"—correspond to the region that encompasses both dimensions.

At block 810, the embodiment can locate and act upon tuple values in column stores that are associated with the identified subset of regions. For example, a storage engine might select one of the identified regions, i.e., one of those corresponding to a set bit position in the intersected bitmap. From the selected region, the embodiment can traverse to leaf records associated with the selected region and scan the column store associated with the leaf record in order to find the tuple value.

Figure 9:
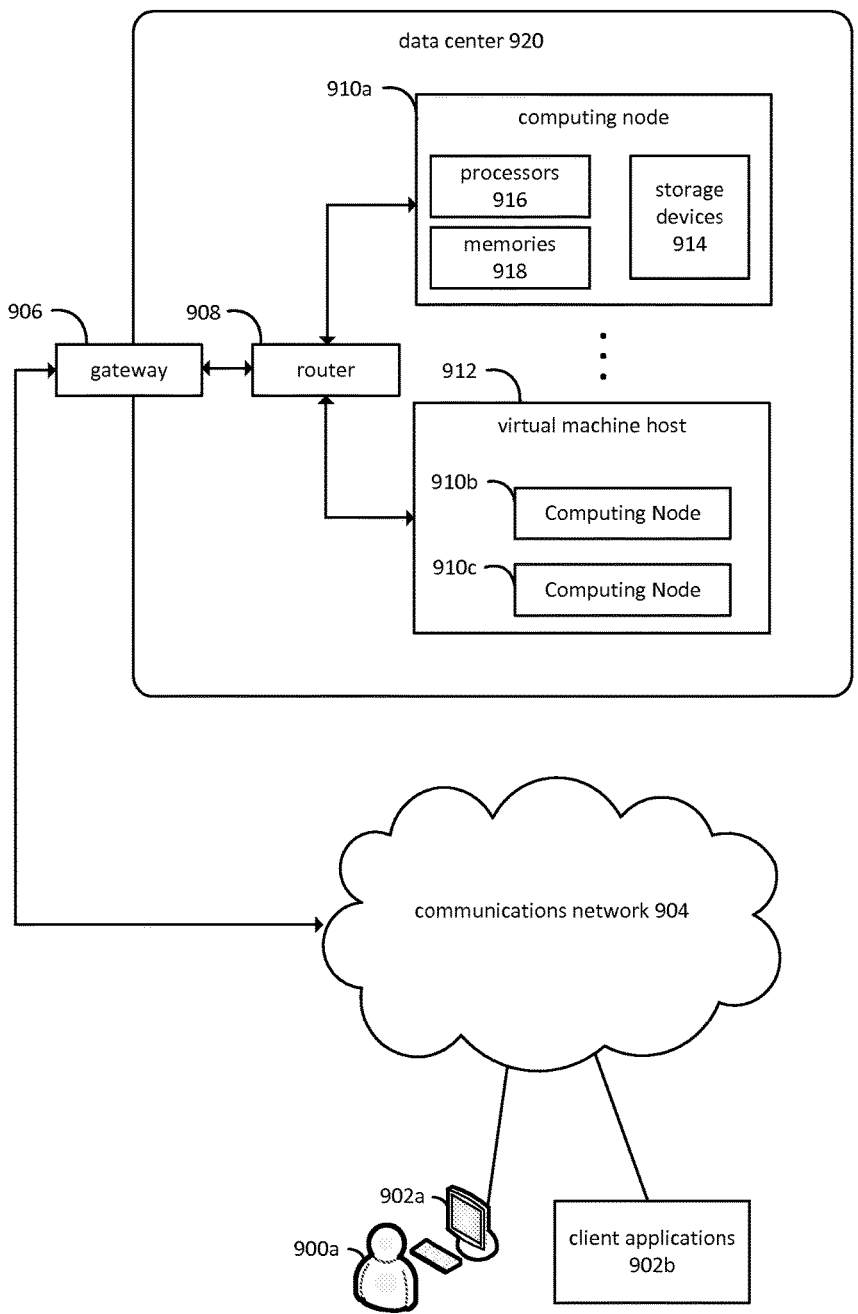
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910*a*, 910*b*, and 910*c* within a data center 920. Alternatively, client applications 902*b* may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910*a*, 910*b*, and 910*c*, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a*, 910*b*, and 910*c*. Some of these intermediate layers may themselves comprise processes executing on one or more of the computing nodes. Computing nodes 910*a*, 910*b*, and 910*c*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
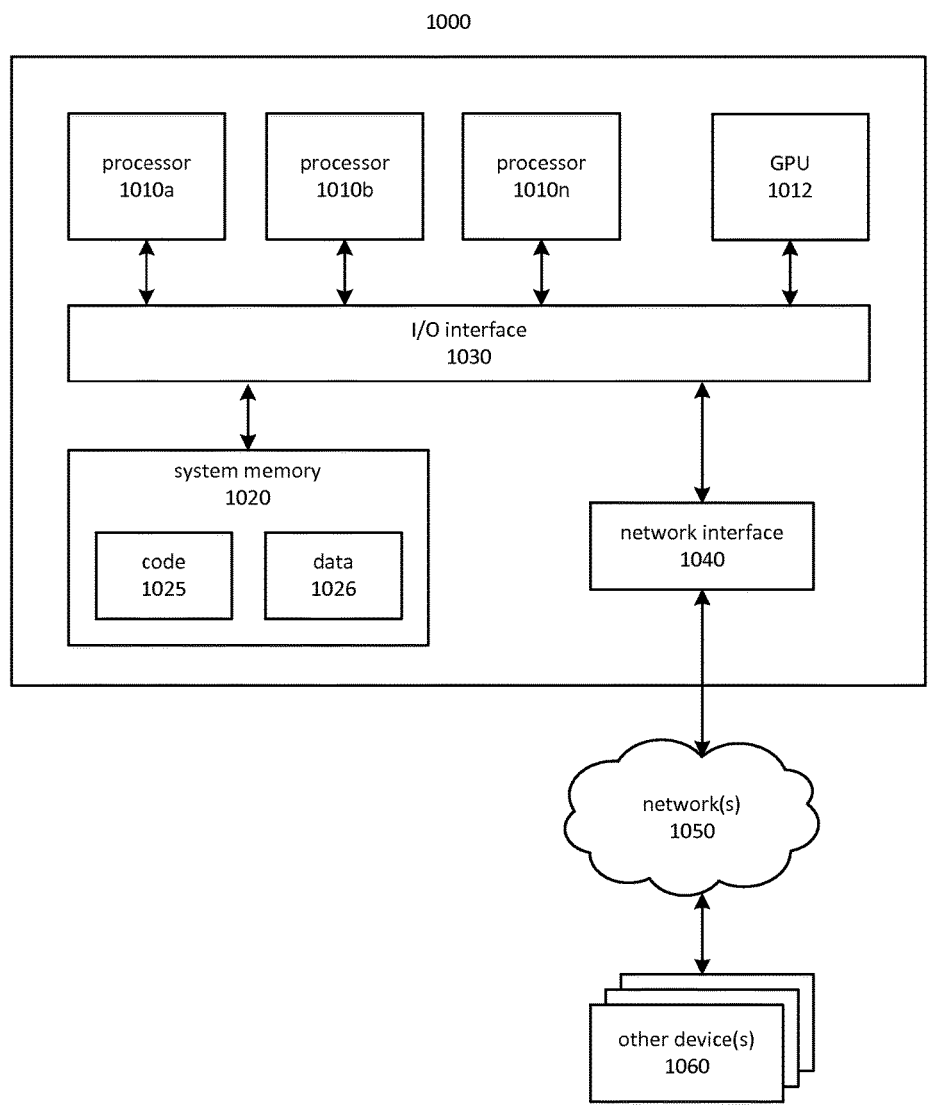
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/ or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
one or more memories having stored thereon computer-readable instructions that, upon execution by a computing device, cause the system at least to:
store a plurality of records representative of a hierarchy of regions of a multidimensional space with one or more dimensions corresponding to one or more columns of the table, the plurality of records comprising at least a first interior record and a first leaf record, the first interior record comprising information indicative of a first region of the multidimensional space and information for accessing the first leaf record, the first leaf record comprising a subset of columnar data for a first dimension of the multidimensional space, wherein the subset of columnar data is encompassed by the first region;
form a first set representation of records, of the plurality of records, that correspond to regions of the multidimensional space that encompass a first value of a first column of a row to be added to the table, wherein the first value is of the first dimension;
form a second set representation of records, of the plurality of records, that correspond to regions of the multidimensional space that encompass a second value of a second column of the row, wherein the second value is of a second dimension of the table;
determine, based at least in part on an intersection of the first set representation and the second set representation, that none of the records, of the plurality of records, contains information indicative of a region that encompasses a point comprising the first value in the first dimension and the second value in the second dimension;
modify the information indicative of the first region in the first interior record so that the first region encompasses the point; and
add the first value of the first dimension to the columnar data stored in the first leaf record.

2. The system of claim 1, further comprising one or more memories having stored thereon computer-readable instructions that, upon execution by the computing device, cause the system at least to:
split the first interior record into at least two additional interior records, wherein each additional interior record is indicative of a region that encompasses at least a subset of the first region.

3. The system of claim 1, further comprising one or more memories having stored thereon computer-readable instructions that, upon execution by the computing device, cause the system at least to:
make a determination to defer a split of the first interior record, wherein the determination is based at least in part on an amount of overlap of the first region with other regions of the hierarchy of regions and a target size of the subset of columnar data.

4. The system of claim 1, wherein the information indicative of the first region comprises a first list of minimum values and a second list of maximum values.

5. A method, comprising:
storing a plurality of records representative of a hierarchy of regions of a multidimensional space, the plurality of records comprising at least a first interior record and a first leaf record, the first interior record comprising information indicative of a first region of the multidimensional space and information for accessing the first leaf record, the first leaf record comprising a subset of columnar data for a first dimension, wherein the subset of columnar data is encompassed by the first region;
forming a first set representation of records, of the plurality of records, that correspond to regions of the multidimensional space that encompass a first value of a tuple of data to be stored on the one or more storage devices, the first value of the first dimension;
forming a second set representation of records, of the plurality of records, that correspond to regions of the multidimensional space that encompass a second value of the tuple, the second value of a second dimension;
determining, based at least in part on an intersection of the first set representation and the second set representation, that none of the records, of the plurality of records, corresponds to a region that encompasses a point comprising the first value in the first dimension and the second value in the second dimension;
modifying the information indicative of the first region in the first interior record so that the first region encompasses the point; and
adding the first value of the first dimension to the columnar data stored in the first leaf record.

6. The method of claim 5, further comprising:
splitting the first interior record into at least two additional interior records, wherein each additional interior record is indicative of a region that encompasses at least a subset of the first region.

7. The method of claim 5, further comprising:
making a determination to defer a split of the first interior record, the determination based at least in part on overlap of the first region with other regions of the hierarchy of regions and a target size of the subset of columnar data.

8. The method of claim 5, further comprising:
making a determination to add a value to the columnar data stored in the first leaf record based at least in part on at least one of an amount of overlap of the first region with other regions of the hierarchy of regions, depth of the hierarchy of regions, and time spent accessing data in the columnar data.

9. The method of claim 5, further comprising:
adjusting a growth threshold to reduce splitting of regions in the hierarchy of regions, wherein the adjusting is based at least in part on a number of dimensions in the multidimensional space.

10. The method of claim 5, wherein the information indicative of the first region comprises a first list of minimum values and a second list of maximum values.

11. The method of claim 10, wherein the first list of minimum values comprises a first columnar data structure containing minimum values for the first dimension and the second list of maximum values comprises a columnar data structure containing maximum values for the first dimension.

12. The method of claim 5, wherein the first set representation comprises a bit field having bit positions corresponding to records of the plurality of records.

13. A non-transitory computer-readable storage medium having stored thereon instructions that, upon execution by one or more computing devices, cause the one or more computing devices at least to:
store a plurality of records on one or more storage devices, the plurality of records representative of a hierarchy of regions of a multidimensional space, the plurality of records comprising at least a first interior record and a first leaf record, the first interior record comprising information indicative of a first region of the multidimensional space and information for accessing the first leaf record, the first leaf record comprising a subset of columnar data for a first dimension, wherein the subset of columnar data is encompassed by the first region;
form a first representation of a first subset of records, of the plurality of records, that correspond to regions of the multidimensional space that encompass a first value of a tuple of data to be stored on the one or more storage devices, the first value of the first dimension;
form a second representation of a second subset of records, of the plurality of records, that correspond to regions of the multidimensional space that encompass a second value of the tuple, the second value of a second dimension;
determine, based at least in part on an intersection of the first representation and the second representation, that none of the records, of the plurality of records, contains information indicative of a region that encompasses a point comprising the first value in the first dimension and the second value in the second dimension;
modify the information indicative of the first region in the first interior record so that the first region encompasses the point; and
add the first value of the first dimension to the columnar data stored in the first leaf record.

14. The non-transitory computer-readable storage medium of claim 13, comprising further instructions that, upon execution by the one or more computing devices, cause the one or more computing devices to at least:
split the first interior record into at least two additional interior records, wherein each additional interior record is indicative of a region that encompasses at least a subset of the first region.

15. The non-transitory computer-readable storage medium of claim 13, comprising further instructions that, upon execution by the one or more computing devices, cause the one or more computing devices to at least:

defer a split of the first interior record based at least in part on a target size of the subset of columnar data.

16. The non-transitory computer-readable storage medium of claim 13, comprising further instructions that, upon execution by the one or more computing devices, cause the one or more computing devices to at least:
   determine that the first region encompasses a second point comprising a second value in the first dimension; and
   determine that the second value is stored in the subset of columnar data for the first dimension.

17. The non-transitory computer-readable storage medium of claim 13, comprising further instructions that, upon execution by the one or more computing devices, cause the one or more computing devices to at least:
   increase a growth threshold to reduce splitting of regions in the hierarchy of regions, wherein the increase is based at least in part on a number of dimensions in the multidimensional space.

18. The non-transitory computer-readable storage medium of claim 13, wherein the information indicative of the first region comprises a list of at least one of minimum values and maximum values stored as column-centric data.

19. The non-transitory computer-readable storage medium of claim 18, wherein the list comprises one or more columnar data structures containing minimum values for the first dimension and maximum values for the first dimension.

20. The non-transitory computer-readable storage medium of claim 13, comprising further instructions that, upon execution by the one or more computing devices, cause the one or more computing devices to at least:
   form the first representation as a bit field in which bit positions corresponding to the first subset of records are set to one.

* * * * *